(12) United States Patent
Flucht et al.

(10) Patent No.: US 9,180,797 B2
(45) Date of Patent: Nov. 10, 2015

(54) VEHICLE SEAT

(75) Inventors: Stefan Flucht, Burscheid (DE); Peter Szegeny, Leverkusen (DE); Martin Kuzma, Trencin (SK); Richard Ogorek, Trencin (SK)

(73) Assignee: Johnson Controls Technology Company, Holland, MI (US)

( * ) Notice: Subject to any disclaimer, the term of this patent is extended or adjusted under 35 U.S.C. 154(b) by 689 days.

(21) Appl. No.: 12/680,711

(22) PCT Filed: Oct. 2, 2008

(86) PCT No.: PCT/EP2008/008378
§ 371 (c)(1),
(2), (4) Date: Jul. 19, 2010

(87) PCT Pub. No.: WO2009/046940
PCT Pub. Date: Apr. 16, 2009

(65) Prior Publication Data
US 2010/0295352 A1 Nov. 25, 2010

(30) Foreign Application Priority Data

Oct. 2, 2007 (DE) .......................... 10 2007 047 348
Jan. 28, 2008 (DE) .......................... 10 2008 006 414

(51) Int. Cl.
*B60N 2/02* (2006.01)
*B60N 2/20* (2006.01)
*B60N 2/30* (2006.01)

(52) U.S. Cl.
CPC *B60N 2/20* (2013.01); *B60N 2/305* (2013.01); *B60N 2/3013* (2013.01)

(58) Field of Classification Search
CPC ........ B60N 2/305; B60N 2/3013; B60N 3/20; B60N 3/206
USPC ......... 297/331, 335–337, 341, 378.1, 378.12, 297/378.14; 269/65.09, 65.16
See application file for complete search history.

(56) References Cited

U.S. PATENT DOCUMENTS

| | | | | |
|---|---|---|---|---|
| 5,466,048 A | * | 11/1995 | Fowler et al. | 297/378.12 |
| 5,641,202 A | * | 6/1997 | Rus | 297/335 |
| 5,957,522 A | * | 9/1999 | Matsuhashi et al. | 296/66 |
| 6,010,190 A | * | 1/2000 | Downey | 297/340 |
| 6,183,033 B1 | * | 2/2001 | Arai et al. | 296/65.09 |

(Continued)

FOREIGN PATENT DOCUMENTS

| | | | | |
|---|---|---|---|---|
| DE | EP 0422527 B1 | * | 12/1994 | ............... B60N 2/36 |
| DE | 44 27 061 A1 | | 2/1996 | |

(Continued)

OTHER PUBLICATIONS

International Search Report for application No. PCT/EP2008/008378 mailed Apr. 20, 2009.

*Primary Examiner* — David R Dunn
*Assistant Examiner* — Tania Abraham
(74) *Attorney, Agent, or Firm* — Fletcher Yoder, P.C.

(57) ABSTRACT

A vehicle seat includes a seat part and a backrest. Both the seat part and the backrest may be reversibly moved from a usage position to a stowed position. A sensor detects the position of the seat part. The seat may also be moved to an easy-entry position by rotation about an axis, and another sensor may detect the longitudinal position of the seat part in the easy-entry position.

7 Claims, 10 Drawing Sheets

(56) References Cited

U.S. PATENT DOCUMENTS

| | | | |
|---|---|---|---|
| 6,250,704 B1 | 6/2001 | Garrido | |
| 6,695,405 B2 * | 2/2004 | Senseby et al. | 297/378.1 |
| 6,698,835 B2 * | 3/2004 | Kojima et al. | 297/344.1 |
| 6,817,646 B2 * | 11/2004 | Kikuchi et al. | 296/65.05 |
| 7,293,838 B2 * | 11/2007 | Sugama et al. | 297/378.1 |
| 7,695,058 B2 * | 4/2010 | Satta et al. | 297/15 |

FOREIGN PATENT DOCUMENTS

| | | |
|---|---|---|
| DE | 102 01 897 A1 | 9/2002 |
| DE | 101 23 776 A1 | 11/2002 |
| DE | 102 29 599 A1 | 1/2004 |
| DE | 10 2005 017 772 A1 | 1/2006 |
| EP | 1 623 865 A2 | 2/2006 |
| WO | 98/54024 A | 12/1998 |

* cited by examiner

VEHICLE SEAT

CROSS REFERENCE TO RELATED APPLICATIONS

This application claims priority from and the benefit of PCT Application No. PCT/EP2008/008378, filed on Oct. 2, 2008; German Patent No. DE 10 2007 047 348.8, filed on Oct. 2, 2007; and German Patent DE 10 2008 006 414.9, filed on Jan. 28, 2008; all entitled "Vehicle Seat", which are herein incorporated by reference.

BACKGROUND

The invention relates to a vehicle seat comprising a seat part and a backrest, which in each case may be reversibly moved from a usage position into a stowed position.

Such vehicle seats are disclosed, for example, in DE 101 23 776 A1 as well as U.S. Pat. No. 6,250,704. Moreover, vehicle seats having the possibility of adjustment are known in which initially the seat part is pivoted from a usage position to the front and then the backrest is pivoted into the space previously adopted by the seat part into a loading base position ("flip-and-fold action"). Moreover, vehicle seats are known which may be adjusted into an easy-entry position.

SUMMARY

The object of the invention is to provide a generic vehicle seat which has increased operating comfort.

The object is achieved by a vehicle seat comprising a seat part and a backrest, which in each case may be reversibly moved from a usage position into a stowed position and which comprises a sensor which detects the position of the seat part.

According to the invention, the vehicle seat comprises a seat part on which the vehicle occupant is seated and a backrest. Both the backrest and the seat part may be moved from a usage position in which the vehicle seat may be occupied by a vehicle occupant into a stowed position. In the stowed position, the backrest is preferably inclined into a substantially horizontal position, so that its side remote from the vehicle occupant may be used as a loading surface and/or bearing surface. The seat part, when moved into the stowed position, is also altered in its position. Preferably, for moving into the stowed position the seat part is rotated about a rotational axis which is located in the region of the leg support or in front thereof, particularly preferably by 90°, so that the space which it has adopted in the usage position is available, for example, for the stowed position of the backrest. Preferably, the seat part is arranged substantially vertically in the stowed position. The motion of the seat part does not have to be a purely rotational motion but may be overlaid by other motion components. When moving the seat part, in the sense of the present invention, the entire seat part does not have to be displaced. For example, according to the invention it is sufficient if the seat part structure remains stationary and only the seat shell is displaced. Preferably, the vehicle seat is arranged in a longitudinally displaceable manner by means of a lower and upper rail. Preferably, the inclination of the backrest may be adjusted for the purposes of comfort.

Moreover, according to the invention, the vehicle seat comprises a sensor which detects the position of the seat part, i.e. whether the vehicle seat is located in the usage position or in the stowed position. This sensor may be an electrical/electronic or mechanical sensor, it preferably being a mechanical sensor. Depending on the sensor, i.e. on its signal or its position, therefore, the motion of the backrest is affected when moved from the usage position into the stowed position, for example the possible rotational angle is altered.

Preferably, the vehicle seat may be moved into a so-called easy-entry position. In this easy-entry-position, the entire vehicle seat is preferably altered in its position, in particular displaced in the direction of travel or counter to the direction of travel. Moreover, the backrest is inclined by a specific degree in the direction of the seat part, said degree of inclination being less than in the stowed position. Preferably, for moving from the usage position into the easy-entry position or into the stowed position, the backrest may be rotated about a rotational axis, in particular the same rotational axis.

In a preferred embodiment, the sensor is operatively connected to a means which limits the rotational angle of the backrest, as long as the vehicle seat is in the usage position. This preferred embodiment has the advantage that the backrest may only be moved into the easy-entry position whilst the seat part is in its usage position. This is particularly preferably achieved by the sensor activating a locking element whilst the seat part is in the usage position. Preferably, this locking element is arranged on the backrest and in the activated state transmits its rotational motion to a rotary member, which limits the rotational angle of the backrest, so that said backrest may preferably only be moved into its easy-entry position. Particularly preferably, the rotary member optionally cooperates with a longitudinal displacement locking means. This embodiment has the advantage that by moving the backrest simply into the easy-entry position, preferably the entire vehicle seat may be unlocked and then displaced longitudinally. This is advantageous for the easy-entry mechanism.

According to a further invention or preferably, the vehicle seat comprises a sensor which detects the longitudinal position of the seat part in the easy-entry position.

Preferably, the sensor optionally activates a locking means which limits the motion of the backrest.

DRAWINGS

The invention is explained below with reference to FIGS. 1-16. These explanations are provided merely by way of example and do not limit the general inventive idea.

DETAILED DESCRIPTION

Figure 1:
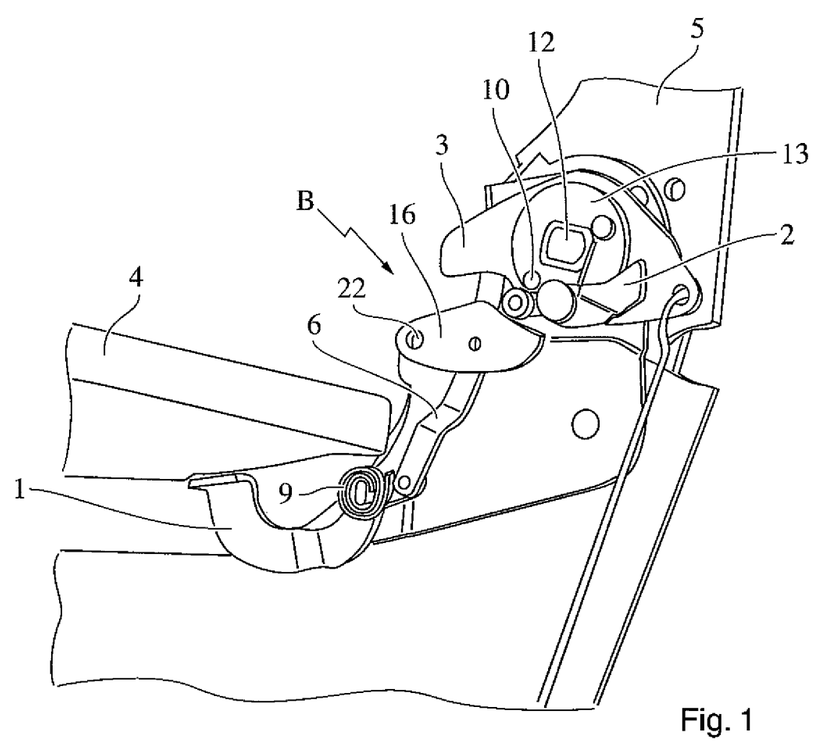
FIG. 1 shows an upper portion of an activation kinematic system according to the invention, in a partial schematic view.
Figure 8:
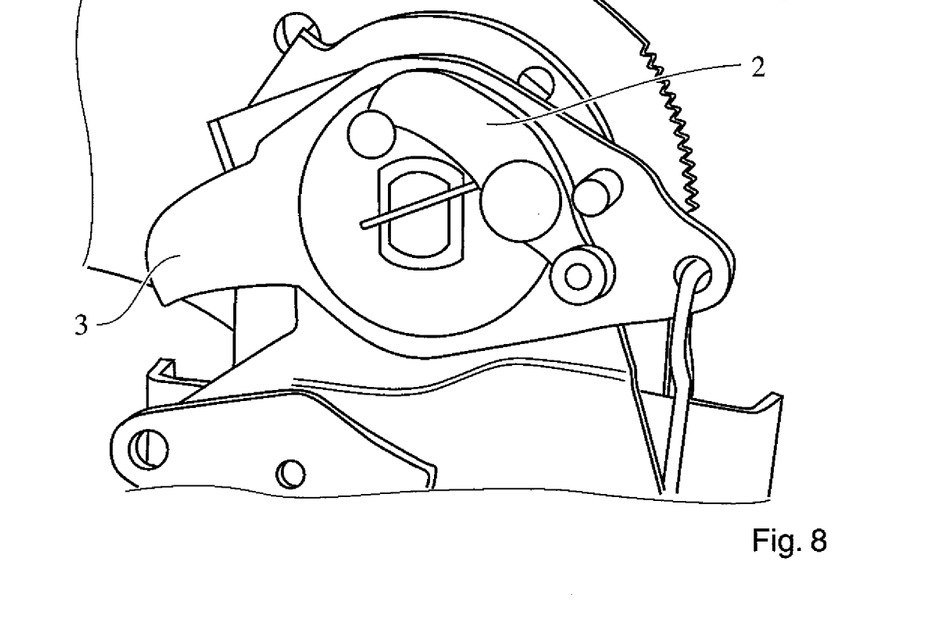
FIG. 8 shows the arrangement of FIG. 7 with the backrest portion inclined to the front.
Figure 9:
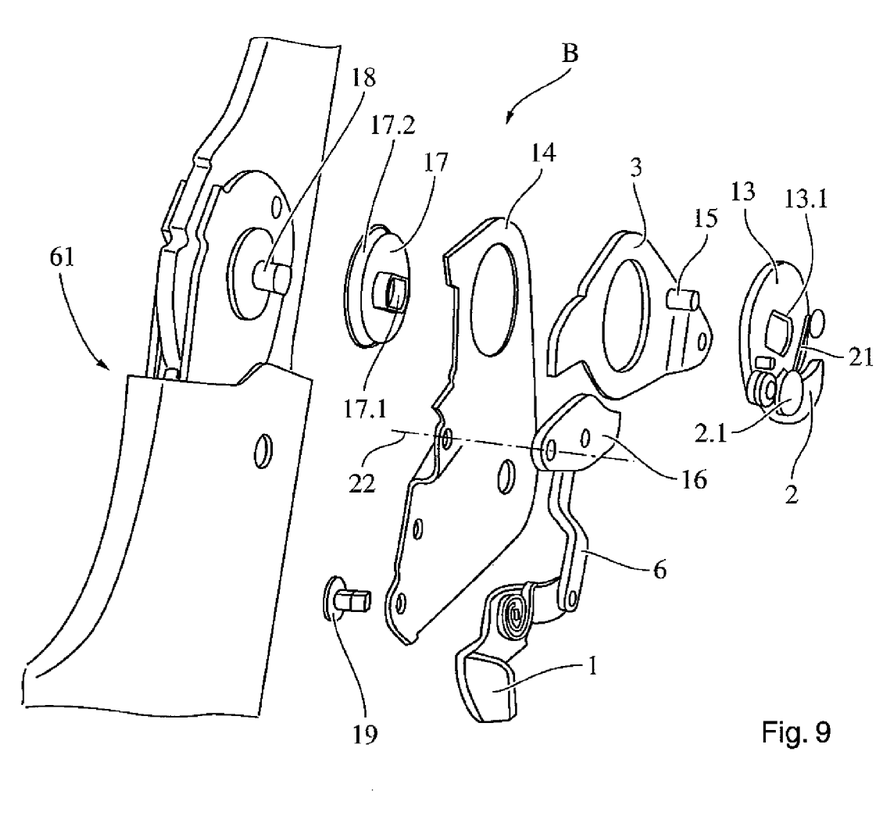
FIG. 9 shows individual components of the activation kinematic system according to the invention in an exploded view.

FIGS. 1 and 9 show, in a partial schematic view, an upper portion of an activation kinematic system B according to the invention for a vehicle seat. The vehicle seat comprises a seat cushion shell 4 shown only in partial view, which may be pivoted upward about a horizontal first pivot axis, not shown, from a usage position to the front, i.e. away from the vertical backrest, into a forward stowed position, in which it is aligned substantially vertically. A backrest portion 5, of which the inclination may be adjusted, rotating with the backrest, not shown, may be rotated about a horizontal second pivot axis, which is supported on the seat part. The vehicle seat is further provided with a longitudinal adjusting device which comprises a seat sliding mechanism, not shown, for adjusting the longitudinal position of the vehicle seat relative to the vehicle floor, as well as a longitudinal locking pawl 7 visible in FIG. 8 by which the vehicle seat may be locked in the longitudinal position.

As visible, in particular, from FIGS. 1 and 9, the activation kinematic system B comprises a sensor arm 1 which is rotatable about a first horizontal rotational axis 19 and fastened to a fitting part 14, which is connected in an articulated manner to a guide arm 6, the motion thereof being mechanically coupled to a cam disk 16 also arranged rotatably on the fitting part 14, and rotating said cam disk about the rotational axis 22 thereof. The cam disk 16 has a guide surface 60 on which a roller 20 rolls, which is rotatably arranged on a pawl 2. Said pawl 2 is rotatably arranged about a rotational axis 2.1, which is connected to a rotary part 13. Said rotary part 13 is connected fixedly in terms of rotation to a bearing 17 by the cooperation of the positive and/or non-positive connecting means 13.1 and 17.1. The bearing 17 is in turn connected fixedly in terms of rotation to the backrest portion 5 by the cooperation of the shaft 18 and the positive connecting means 17.1. Accordingly, a rotation of the backrest portion 5 ultimately also rotates the pawl 2. The bearing 17 comprises, moreover, a bearing surface 17.2 on which a rotary member 3 is rotatably mounted.

Figure 2:
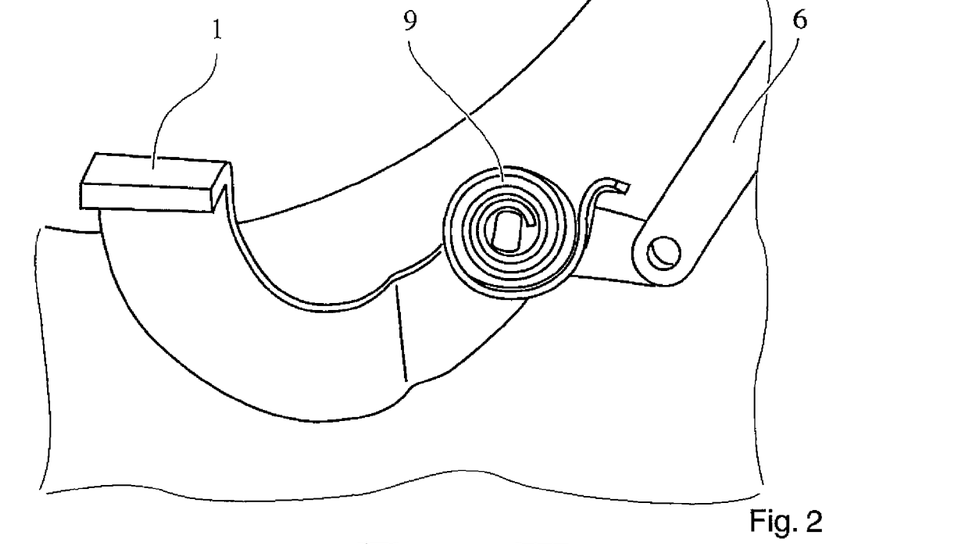
FIG. 2 shows the activation kinematic system of FIG. 1 in the region of the sensor arm.
Figure 3:
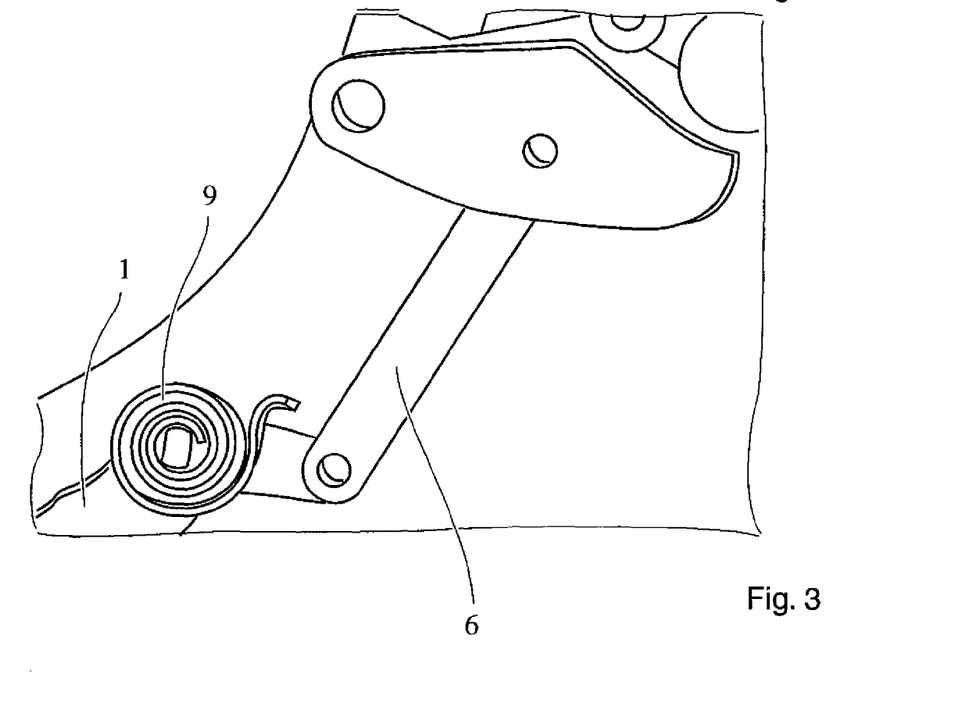
FIG. 3 shows the activation kinematic system of FIG. 1 in the region of the guide arm.
Figure 4:
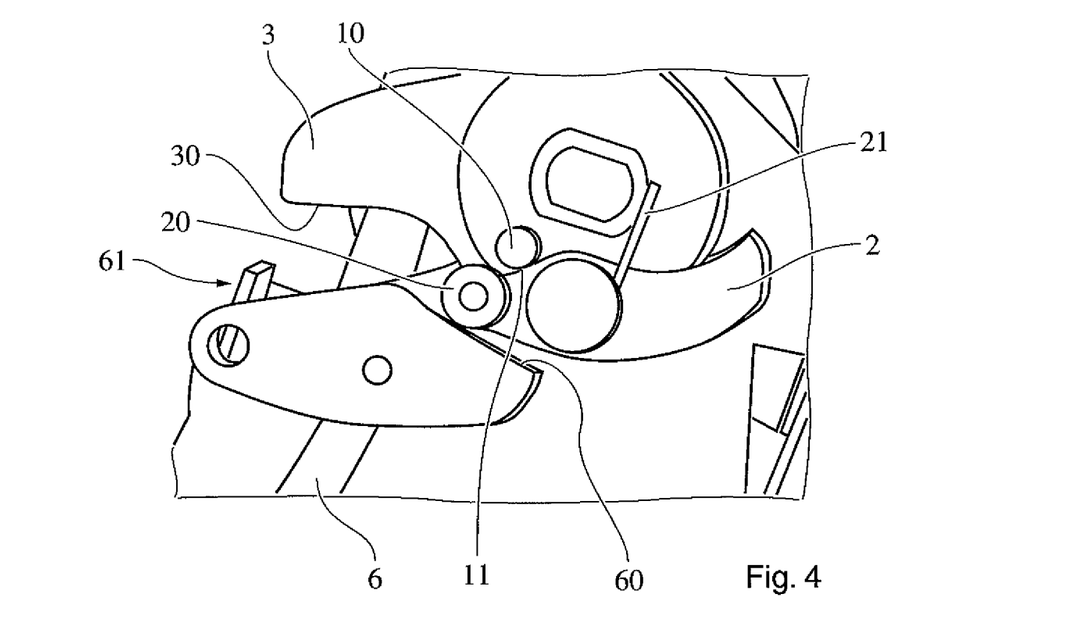
FIG. 4 shows the activation kinematic system of FIG. 1 in the region surrounding the pawl, with the pawl coupled to the rotary member.
Figure 5:
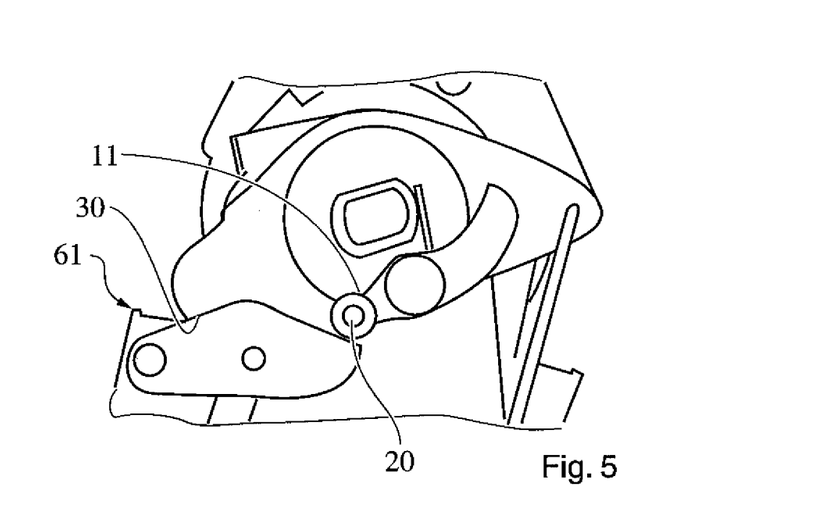
FIG. 5 shows the arrangement of FIG. 4 with the backrest portion inclined to the front.

If the seat cushion shell 4 is moved from the folded forward position into the usage position, the sensor arm 1, the immediate vicinity thereof being shown in FIG. 2, is rotated counterclockwise against the resistance of a torsion spring 9. The motion of the sensor arm 1 is transmitted to the guide arm 6 which is connected in an articulated manner to the sensor arm 1; the immediate vicinity thereof being shown in FIG. 3. The guide arm 6 in turn actuates the pawl 2 via the cam disk 16, i.e. displaces the pawl counterclockwise against the resistance of a wire spring 21 in a rotary motion, whereby the pawl 2 is moved into a position in which it is ensured that a coupling slot 11 provided in the pawl 2 and a stop pin 10 provided on the rotary member 3 come into engagement with one another, in order to couple together mechanically the rotary motion of the pawl 2 and the rotary motion of the rotary member 3 in this manner. The situation in which the stop pin and the coupling slot are in engagement is shown in FIG. 4. With a rotation of the pawl 2 effected by folding forward the backrest, the pawl drives the rotary member 3, so that said rotary member is also displaced in a rotary motion counterclockwise. During its rotary motion, the pawl 2 is supported on the guide arm 6 via a roller 20 provided on the pawl 2, which rolls on a guide surface 60 provided on the guide arm 6, whereby the pawl 2 is always held in a locked position relative to the rotary member 3, in which the coupling slot 11 and the stop pin 10 remain in engagement with one another. The rotary motion of the rotary member 3 and thus also the pawl 2 mechanically coupled to the rotary member 3, and finally the backrest is defined by a stop abutment 61 preferably provided on the seat part, when the stop abutment comes to bear against a stop edge 30 of the rotary member 3. The situation in which the stop edge 30 bears on the stop abutment 61 is shown in FIG. 5. In this manner, the folding motion of the backrest portion and thus of the backrest, may be limited to a maximum inclination relative to the vertical, corresponding to the easy-entry position of the backrest.

Figure 6:
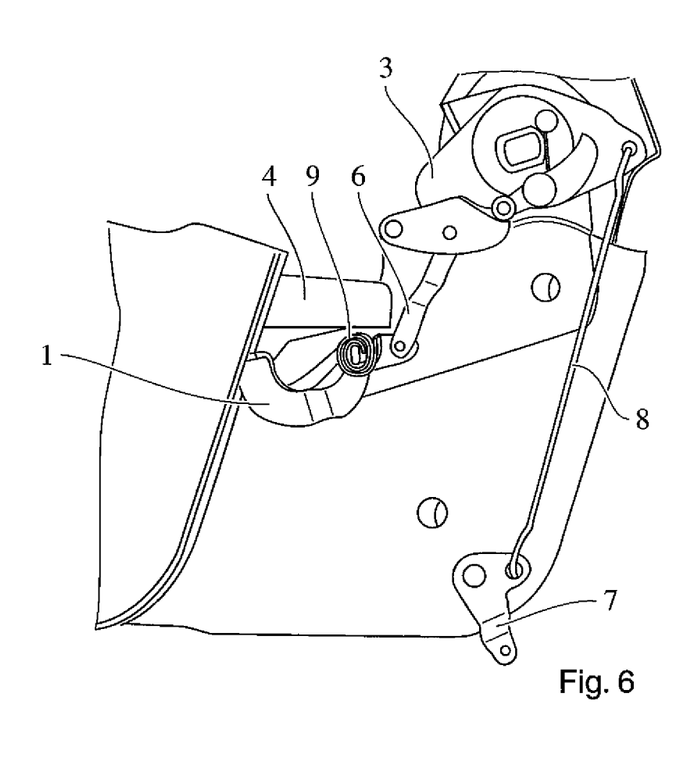
FIG. 6 shows a lower portion of the activation kinematic system according to the invention in a partial schematic view.

At the same time, by means of the transmission mechanism 8 which comprises a rigid transmission bar connected in an articulated manner to the rotary member 3, by actuating the rotary member 3 the longitudinal locking pawl 7 is moved into its unlocked position shown in FIG. 6, after which the vehicle seat may be adjusted in the longitudinal direction.

Figure 7:
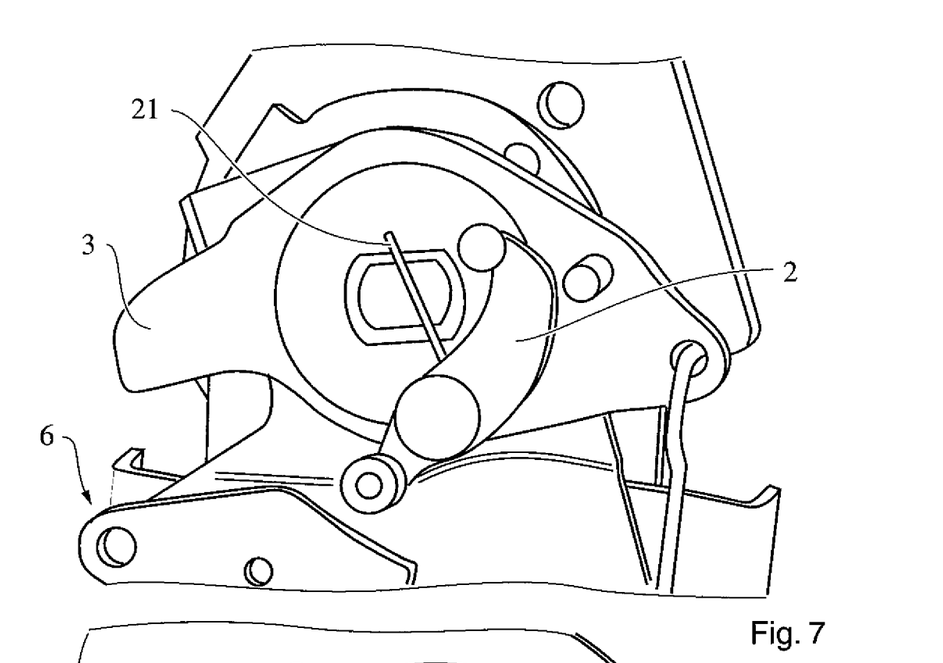
FIG. 7 shows the activation kinematic system of FIG. 1 in the region surrounding the pawl, with the pawl uncoupled from the rotary member.

If the seat cushion shell 4 is now folded forward from the usage position, the counter force which holds the guide arm 6 in position against the action of the torsion spring 9 and which is produced by the action of the force of the sensor arm 1, via the seat cushion shell 4, is absent. As a result, the guide arm 6 is moved under the influence of the resilient force of the torsion spring 9 into the position shown in FIG. 7, in which the guide arm 6 is no longer in contact with the pawl 2. The pawl is moved by the wire spring 21 into a position in which the coupling slot 11 and the stop pin 10 provided on the rotary member 3, are brought out of engagement, removing the mechanical coupling between the pawl 2 and the rotary member 3.

Now the pawl 2, as shown in FIG. 8, without its coupling slot 11 being able to come into engagement with the stop pin 10, may be rotated sufficiently counterclockwise for the backrest 5 rotating with the pawl 2 to be able to be pivoted forward considerably beyond the easy-entry position as far as a loading base position (stowed position), into the space opened up by the seat cushion shell during the folding forward thereof. Thus a flip-and-fold action is implemented. The uncoupling of the motion of the rotary member 3 from the motion of the pawl 2 also inevitably results in the uncoupling of the motion of the longitudinal locking pawl 7 from the motion of the pawl 2, so that the backrest may be pivoted forward without the longitudinal locking pawl 7 being actuated and/or moved into its unlocked position.

The correct functioning of the mechanical sensor implemented by the sensor arm 1 and which detects the position of the seat cushion shell 4, is ensured for all positions of the backrest (comfort positions).

In the vehicle seat according to the invention, the user accordingly does not have to select whether he or she would like to move the backrest into the easy-entry position or the usage position. As long as the seat part is in its usage position, the backrest may only be pivoted into the easy-entry position. If the seat part, however, is in the stowed position, by the application of a torque the backrest is automatically pivoted into its stowed position.

FIGS. 10-16 show a further embodiment of the vehicle seat according to the invention. The backrest portion 5 and the rotary member 3 are rotatably arranged about the rotational axis 12 on a plate 29 which is connected to the seat part. The rotary member 3 further comprises the rotary part 13 which is mounted rotatably about the rotational axis 12 on the rotary member 3. The rotary member 3 is rotatably pretensioned by means of the torsion spring 31 counterclockwise. In the illustrated embodiment, the transmission mechanism 8 includes a cable which is arranged on the rotary member 3, and which is connected to a longitudinal locking pawl 7 and, as a result, may unlock the upper and lower rail from one another. Moreover, the pawl 2 is rotatably mounted about the rotational axis 22 on the plate 29, and by means of the torsion spring 9 rotatably pretensioned counterclockwise. The locking element is connected via the cable 8 to a seat part sensor (not shown).

Figure 10:
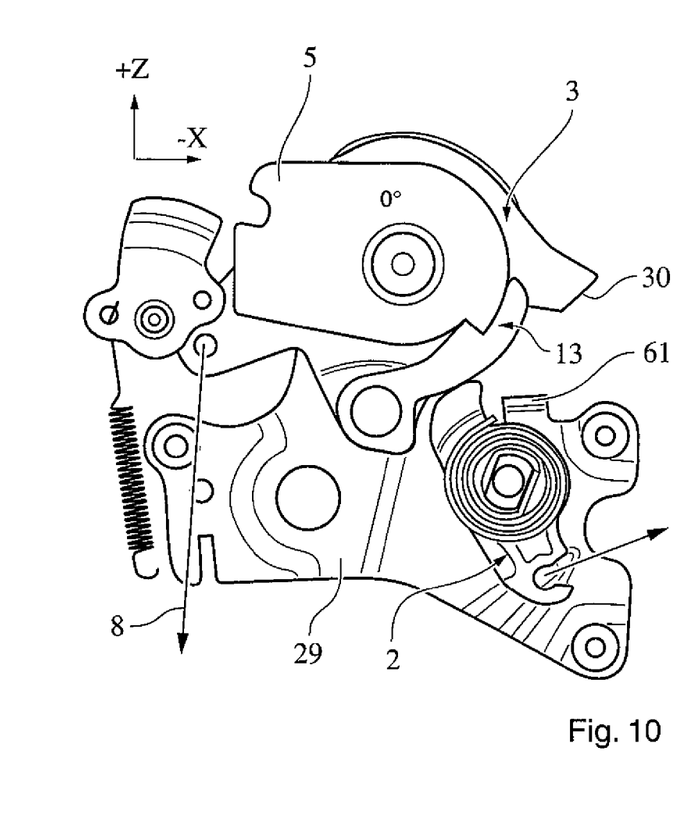
FIGS. 10-16 show a further embodiment of the vehicle seat according to the invention.

In FIG. 10, the vehicle seat is in its usage position. The seat part is in a horizontal position and the backrest is substantially in a vertical position which is to be symbolized by the angle "0 degrees". The locking element is in its locking position and thus forces the rotary part 13 in the direction of the backrest portion 5, so that the stops 50, 130 cooperate in such a manner that in the clockwise direction the parts 5, 3 may only be rotated together.

Figure 11:
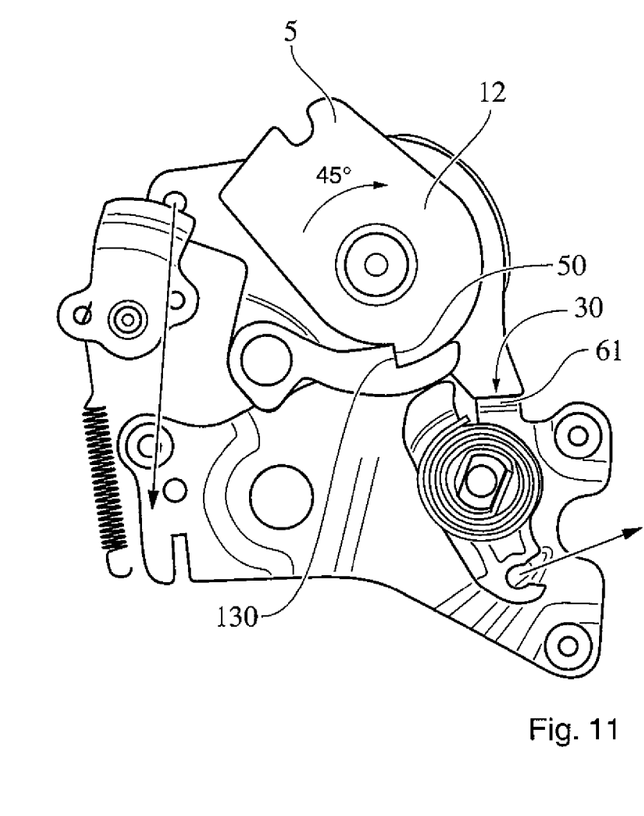

The rotation of the backrest 5 into the easy-entry position is shown in FIG. 11. The backrest portion 5 is pivoted clockwise by 45° in the direction of the seat part and thus drives the rotary member 3 until the stop edge 30 thereof strikes the stop abutment 61 on the plate 29 of the seat part and a further rotation of the parts 3, 5 is limited thereby. By the rotation of the rotary member 3, tensile force is exerted on the transmission mechanism 8 (e.g., the cable), whereby the locking between the upper and the lower rail is released and the vehicle seat may be longitudinally adjusted.

Figure 12:
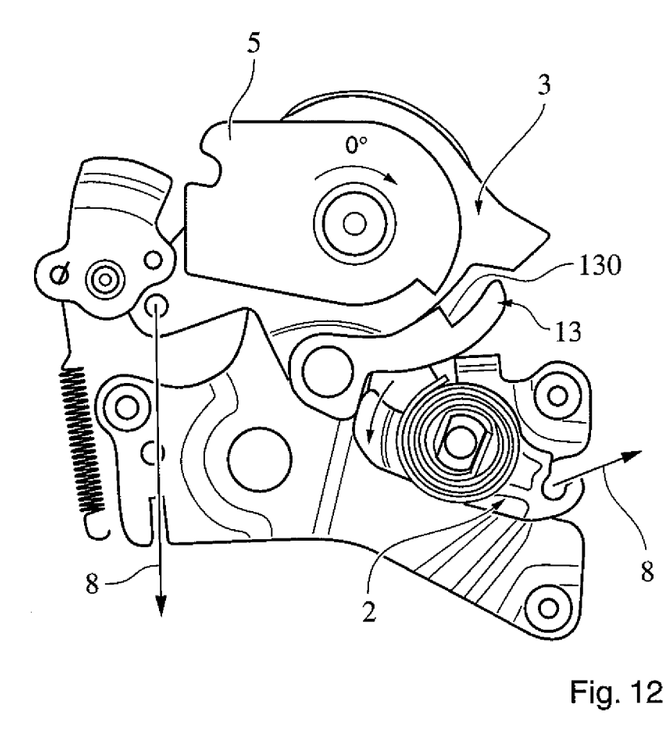
Figure 13:
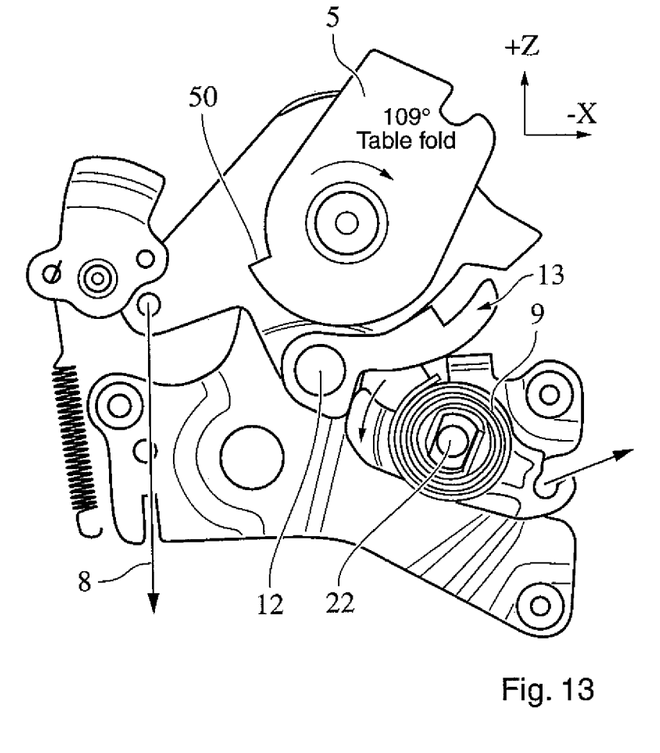

FIG. 12 shows the situation in which the seat part in a stowed position has been moved, in particular, into a vertical position. As a result, tensile force is applied onto the cable, which rotates the locking element 2 as indicated by the arrow counterclockwise and counter to the force of the torsion spring 9. As a result, the locking between the part 2 and the rotary part 13 is cancelled and with a further rotation of the locking element 2 the left tip thereof cooperates with a lug of the rotary part 13, and drives said rotary part clockwise about the rotational axis 12 in a rotational manner. As a result, the stop 130 is moved away from the stop 50, so that the backrest portion 5 is freely rotatable, and the backrest may be moved in its stowed position which is shown in FIG. 13. The rotary member 3 remains stationary during this rotation.

Figure 14:
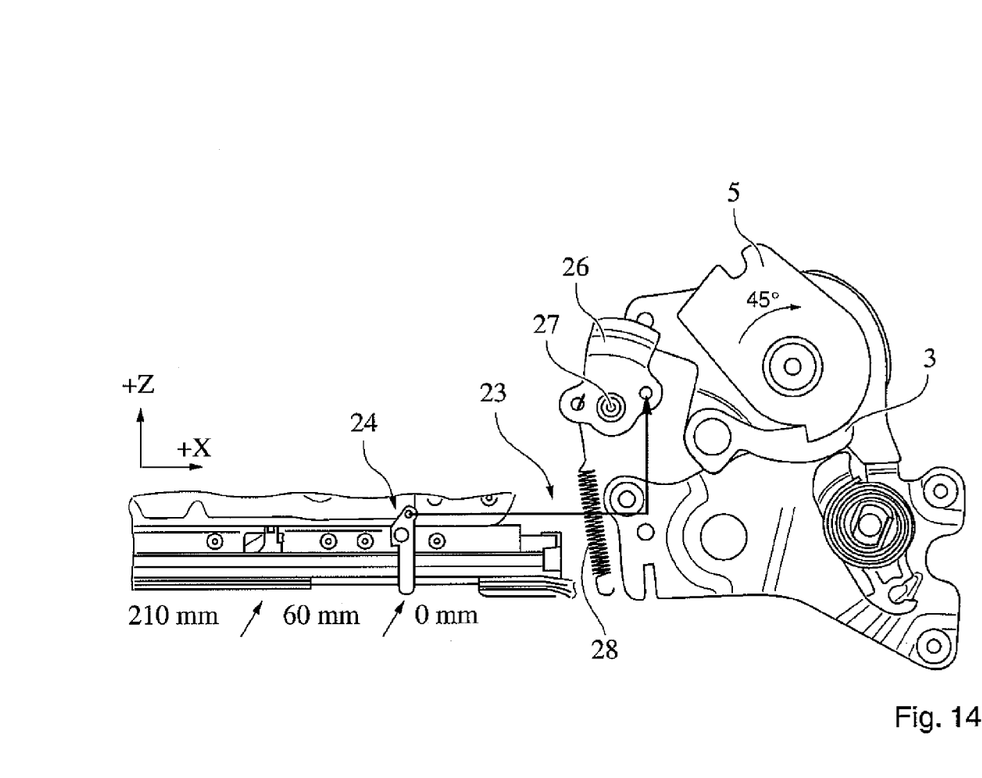
Figure 15:
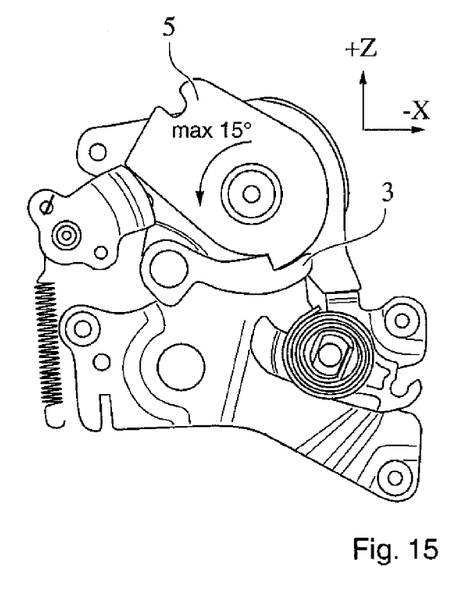

FIGS. 14 and 15 show a further embodiment of the vehicle seat according to the invention. In the event that the backrest is in the easy-entry position which is shown in FIG. 14, and an occupant attempts to displace the seat forward in the range of 60 to 210 mm, a longitudinal displacement sensor 24 is activated, i.e. in the present case the lever 24 is rotated counterclockwise. As a result, the cable 23 is tensioned which, with its one end, is connected to the sensor 24 and, with its other end, is connected to a stop 26. This stop 26 is mounted rotatably about the rotational axis 27, and pretensioned by means of the spring 28 counterclockwise. The sensor 24 rotates the stop 26 clockwise, whereby the rotation of the backrest is limited to a maximum of 15° which is shown in FIG. 15. The person skilled in the art recognizes that this function may optionally be added to the vehicle seat according to the invention.

Figure 16:
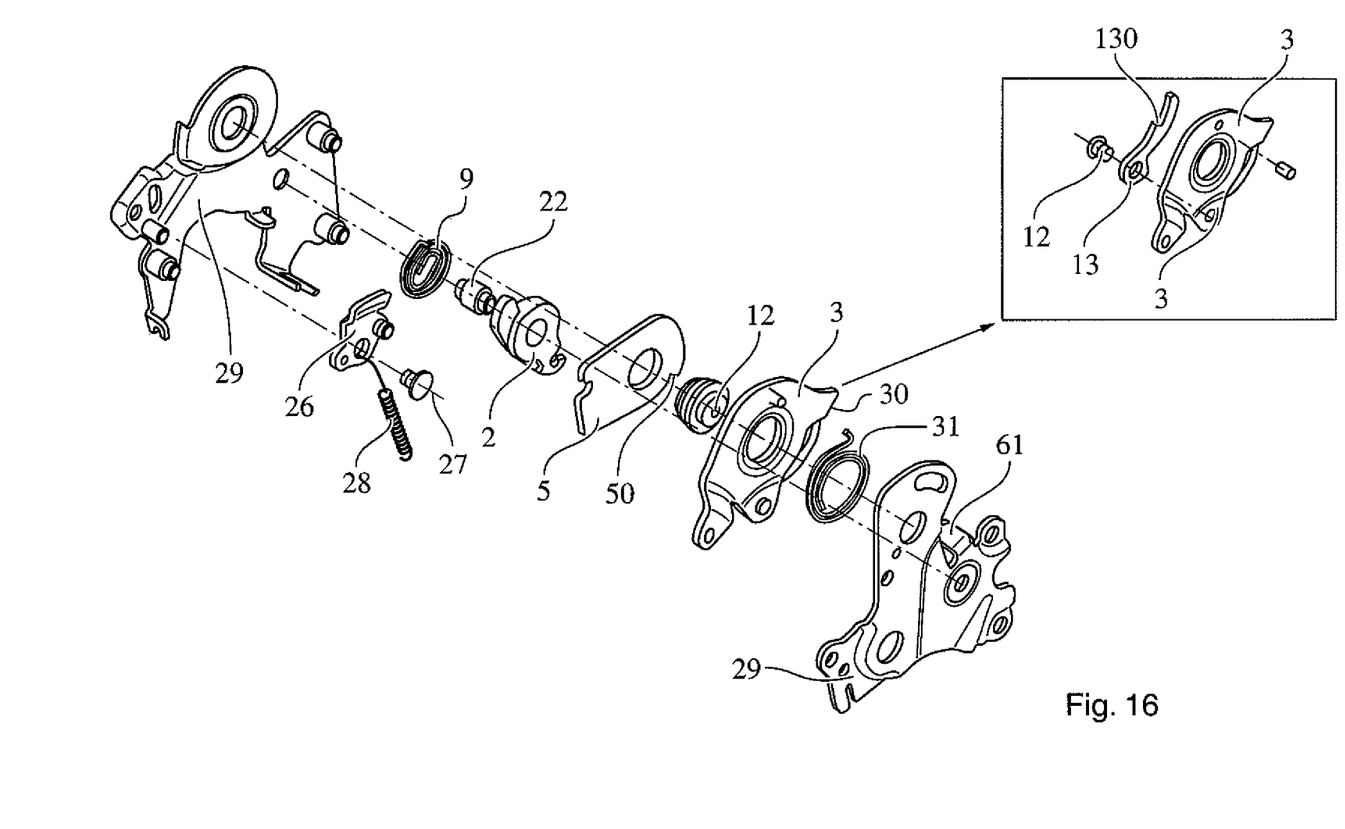

FIG. 16 shows an exploded view of the fitting of the vehicle seat according to the invention.

The invention claimed is:

1. A vehicle seat comprising:
   a seat part, moveable between a first usage position and a first stowed position;
   a backrest, moveable between a second usage position and a second stowed position;
   a sensor rotatable about a first horizontal rotational axis and arranged on a fitting part, wherein the sensor is configured to detect a position of the seat part;
   a cam disk configured to be activated by the sensor in response to detection of the seat part in the first usage position, wherein the cam disk is arranged on the fitting part and, upon activation, is configured to transmit rotational movement to a rotary member that limits a rotational angle of the backrest;
   a guide arm positioned between the sensor and the cam disk, wherein the guide arm is configured to rotate the cam disk about a second horizontal rotational axis; and
   a pawl rotatably coupled to a rotary part and configured to rotate about a third horizontal rotational axis, wherein the pawl comprises a roller configured to engage a guide surface of the cam disk, and the pawl is configured to be mechanically coupled to the rotary member upon activation of the cam disk via engagement of a coupling slot of the pawl and a stop pin of the rotary member;
   wherein the rotary part is coupled to a bearing, and the bearing is coupled to the backrest via a shaft such that rotation of the backrest drives rotation of the pawl.

2. The vehicle seat as claimed in claim 1, wherein the first stowed position is substantially vertical, and the second stowed position is substantially horizontal.

3. The vehicle seat as claimed in claim 1, wherein the backrest is movable into an easy-entry position.

4. The vehicle seat as claimed in claim 3, wherein moving the backrest from the second usage position into the easy-entry position or into the second stowed position includes rotation of the backrest about the third rotational axis.

5. The vehicle seat as claimed in claim 3, comprising a longitudinal position sensor which detects the longitudinal position of the seat part in the easy-entry position.

6. The vehicle seat as claimed in claim 1, wherein the seat is arranged in a longitudinally displaceable manner by means of a lower and an upper rail.

7. The vehicle seat of 1 claim, wherein a stop edge of the rotary member is configured to engage a stop abutment of the seat part to limit the rotational angle of the backrest to a maximum.

* * * * *